Oct. 29, 1963 T. K. PETERSEN 3,108,698
SECTIONAL AIR CUSHION CARGO FLOOR
Filed Dec. 27, 1960 2 Sheets-Sheet 1

INVENTOR.
THORVALD K PETERSEN
BY
*Edwin Coates*
ATTORNEY

3,108,698
SECTIONAL AIR CUSHION CARGO FLOOR
Thorvald K. Petersen, Santa Monica, Calif., assignor to Douglas Aircraft Company, Inc., Santa Monica, Calif.
Filed Dec. 27, 1960, Ser. No. 78,711
6 Claims. (Cl. 214—1)

This invention relates to transport vehicles, including cargo airplanes, and is particularly concerned with means for facilitating the orderly stowage on the floor of the hollow vehicle-body of items of cargo, especially filled cargo-containers carried by pallets. However, it will become apparent hereinafter that the invention is by no means limited in the scope of its utility to employment in cargo airplanes and that it can be utilized in any vehicle body: tubular, rectangular, or otherwise cross-sectionally shaped, provided the body includes a basal floor-framework extending substantially from side-to-side and end-to-end of the substantially hollow cargo space.

Heretofore, items of cargo were winched or hand-loaded into such vehicle bodies and were manually moved into final positions while resting on unimproved flooring attached in one piece to the basal floor-framework. Such floors naturally presented a high coefficient of sliding friction with the load or load-carrying pallet being slid into the vehicle. Also, of course, such floors had to be of invariable width and length, fixed by the length and width of a particular "stock" or quantity-production vehicle, so that no "standard," single-unit, flooring could be employed in a "non-stock" or custom-made vehicle, as it could not be practicably varied in width or length to adapt it to be employed in other vehicles having a body of a different width or length.

Furthermore, special cargo tie-down means, or lashings, were necessitated, especially in cargo airplanes, to prevent drastic shifting of cargo upon changes in attitudes of the airplane, for example.

This invention obviates these and other deficiencies by providing sectionalized, friction-reducing floor, each section being mounted disengageably to the basal floor-framing of the vehicle body, each section also being rectangular in planform and laterally filling the cargo hold, its width fore-and-aft being a sub multiple of the length of the cargo hold. Each section is hollow, the hollow constituting a plenum chamber for pressurized air. Although the dimensions of each of the present sections, transversely of the body, can only be varied by design-changes in this dimension to fit various widths of vehicle bodies, yet in order to fill any vehicle body from front end to rear end it is only necessary to vary the number of these rectangular edgewise abutting sections to fit the longitudinal dimension of the vehicle body, since the present sections or panels are, in their fore-and-aft dimension, sub-multiples of the various longitudinal dimensions of various cargo-holds. The present panels are also readily interchangeable with, or substitutable for, defective panels in various vehicles having a defective panel.

The invention also includes a source of pressurized-air located conveniently in the forward portion of the vehicle body, if the vehicle is aft-loaded, or vice versa if nose-loaded, and each of the panels is hollow but strongly constructed. The hollow in the panel is constituted a plenum chamber, all the chambers being connected in series to the pressure air source. The upper face of each panel is provided with pressure air-outlet openings normally closed by a spring-biased ball valve having a portion projecting slightly above said surface in a position and attitude whereby the downward force exerted thereon by positioning a load on these projecting portions effectuates depression and opening of all the air-outlet valves so depressed. Thereby, as a load is urged onto successive panels toward its stowed position, the lower face of each load item is provided with a film of pressurized-air, of a magnitude of the order of 5–10 p.s.i., serving to both lubricate its movements and to partially buoy up the load. As a consequence, the coefficient of sliding friction between the moving load item and the present floor can be reduced to as low as 0.1 from the usual 3.0 or more, the amount of reduction, of course, depending upon the magnitude per square inch of the pressurized air emitted by said source.

A further feature of the invention resides in a continuous pressure-air manifold or duct running from the source longitudinally rearwardly of the vehicle body adjacent the abutted or assembled panels or sections. A zone-control valve is disposed in this duct laterally opposite the final stowage-station of each loaded pallet or cargo item. Although each zone-control valve could be manually operated by a crew member walking on the walkway that extends longitudinally of the vehicle body from front to rear of the body alongside each side of the longitudinally centrally located stowage spaces occupied by the pallets or load, this invention provides special means for locking the pallet in its proper stowage station which locking means, upon being inserted in a locking station, also concurrently closes the adjacent zone-control valve thus shutting off unneeded lubricating and buoying air from the plenum chamber concerned and hence from underneath the finally stowed item. Removal of the locking pins opens these valves to furnish air to the adjacent plenum chamber. When the final item has been stowed and locked in place all air is thereby shut off from the plenum chambers in the novel floor, after which the air-compressor source of pressurized air is of course de-activated.

In order to facilitate raising of a pallet or cargo item into the rear end of the vehicle body from a lower loading level, which may be the ground or a low loading dock, a special "transition panel," usually narrower fore-and-aft than the other panels but of the same width as theirs, is provided, and has connections to the air source. It is rested by its front edge upon the rearmost portion of the basal floor-framing or the like, slanting downwardly therefrom until its opposite edge rests upon the loading level. Thus, no "winching" up of cargo to the level of the main floor is requisite. This transition panel may thereafter be folded upwardly inside the cargo hold so that the elevated tail or nose section, as the case may be, of the airplane can be lowered into proper position or so that the "clamshell" cargo doors, or the tailgate, if a truck or the like is employed, may be closed.

The other features and advantages of the invention will either be made manifest or become apparent hereinafter.

Solely in order to render the inventive concepts more concrete, and not by way of limitation, the now-preferred embodiment of these and other concepts is representationally illustrated in the accompanying drawings and is described in detail in the following part-by-part exposition thereof.

Figure 1:
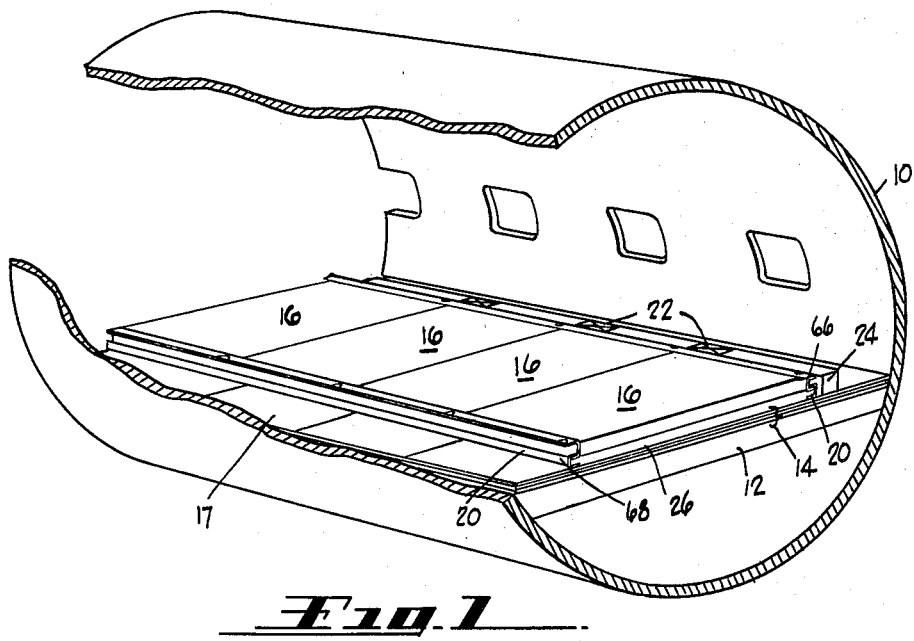
FIG. 1 is a fragmentary perspective view of a cargo airplane fuselage loadable from either the front or the rear end thereof by means of this invention, and showing the friction-reducing sectionalized flooring laid upon the bare basal floor-framing of the fuselage and also showing the air supply and cut-off system.

Referring first to FIG. 1, 10 designates a substantially hollow tubular vehicle body, here shown as a portion of a cargo airplane fuselage, but it is to be understood that body 10 may be that of a truck, a freight car, or any other hollow cargo carrying body that is other than tubular.

Figure 3:
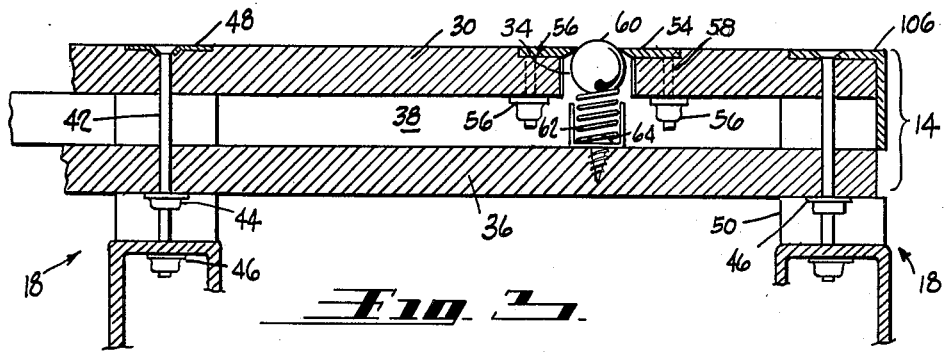
FIG. 3 is an enlarged fragmentary sectional view of one of the flooring sections, taken on line 3—3 of FIG. 2 and sighting in the direction of the arrows, showing a transversely extending wear plate like the one shown in FIG. 6 on the transition panel.

In any case, the lower portion of the body is provided with a metal supporting framework, one of the transversals, 12, of which is shown. This framework extends from side-to-side and end-to-end of the cargo hold of the vehicle. Rectangular, substantially hollow panels 14, made of plywood, for example, and later described, are laid upon this framework with their adjacent longer ends in airtight mutual contact to constitute a substantially uninterrupted, continuous floor. As shown in FIG. 3, each panel is disengageably engaged to a subadjacent stringer, or other longitudinal member, 18, of the supporting framework.

A pair of longitudinally extending, laterally spaced, channel-sectioned guide members 20 is provided for the guidance of pallets 16, later described. The guides 20 are spaced inwardly from the adjacent sides of the vehicle body a distance sufficient to afford a walkway or catwalk 17 along the entire length of the stowed cargo for a purpose later manifested.

Figure 6:
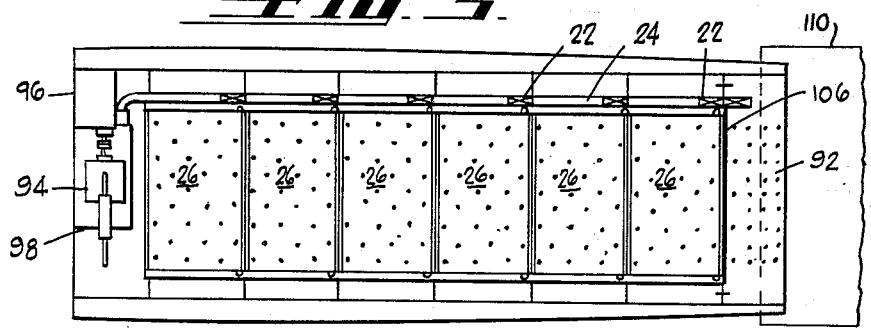
FIG. 6 is a fragmentary, longitudinal section of the fuselage, showing a top-plan view of the novel floor and its air supply means, minus the pallets or other load-articles and illustrating the employment of the transition panel.

As indicated in FIGS. 1 and 6, a pressure air manifold 24 extends longitudinally superadjacent the horizontal, sectionalized floor from a tank 98 filled with compressed air derived from a compressor 94 driven by a motor 96, the manifold dead-ending at the opposite end of the cargo hold from that end which includes the compressor, etc.

It is to be understood that the compressor, etc., will be located at the rear of the fuselage if same is of the nose-loading type, and vice versa.

In the vicinity of each final-stowage position of each pallet or cargo-item and super adjacent each one of the floor sections 14, the manifold is provided with a zone-control valve 22 for respectively admitting, on occasion, pressure air to, and excluding it from, the plenum chamber, 38, in each floor-section as and for the purposes later detailed.

Figure 2:
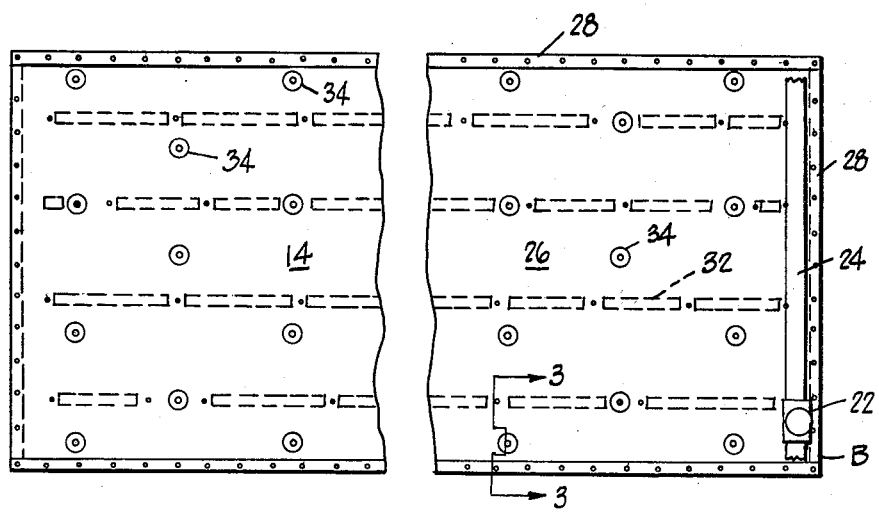
FIG. 2 is a top plan view of one of the friction reducing floor sections also showing a fragment of the pressure-air supplying manifold containing a zone-control air valve means, but shown diagrammatically.

In FIG. 2, a typical one of the floor sections is shown in top plan view, the internal configuration thereof being detailed in FIG. 3. In both these figures it is shown as an oblong unit made of two parallel sheets of plywood, for example, and united at all edges by wooden spacers 28, the long edges preferably being provided with seals or the like, not shown. Each section comprises an upper plywood, for example, lamina 30, spaced apart from an identical lower plywood lamina 36 by means of wooden, preferably, spacers 32 extending lengthwise of the panel and spaced apart transversely of the panel. The laminas and spacers are connected rigidly together and to the stringers 18 by means shown in FIG. 3. These means comprise, at strategic points, a centrally countersunk bolt washer 48 embedded in the top lamina; a flush-head bolt 42, and a nut 44 and washer 46, a wooden transverse spacer 50, and a similar nut 44 and washer 46 on the underside of the flange of the framework stringer 18. Some of the bolts, however, do not pass through the stringers 18, but stop at the lower face of the lower lamina, since not many anchorages are required for the panels.

Figure 4:
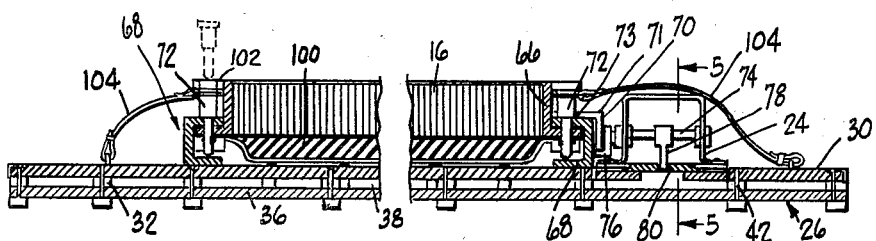
FIG. 4 is a cross-sectional view on line 4—4 of FIG. 5 illustrating the novel flooring section and showing the panel-section provided centrally with guides for pallets and including the pressure air manifold with one of the zone control valves operated by the same means that lock the pallet in its proper stowage station.

As aforementioned, the spacing of the two laminas provides a plenum chamber 38 therebetween which is air tightly closed on all faces and edges except in the upper lamina. As shown in FIGS. 2, 4 and 6 this upper lamina is provided with valved openings 34 distributed substantially uniformly throughout this lamina. The number and spacing of these openings 34 can be designed to vary at the will of the designer, but each opening 34, as shown in FIG. 3, is surrounded by an apertured plate 54, the aperture being concave on its lower face, as shown. The plate 54 is held to the lamina by a nut plate 56 and by the nuts and bolts units 58 shown passing through the upper lamina.

Seated in the concavity in plate 54 is a ball valve, or the like, 60, with a small but sufficient portion of its volume or surface normally projecting slightly above the surface of the upper lamina. The ball valve is urged into its normally closed position by means of a helical spring 62 seated in a cup 64 which is attached, as shown, to the lower lamina. The valves are opened by the downward pressure of the pallets sliding over them.

Each pallet is comprised of a honeycomb core metal-faced structural panel, as shown, having an outwardly opening, channel-section panel binding and guide members 66 at each end thereof. The bottom portion of each pallet is constituted by a lamina of resiliently yieldable material 100, faced off with a tough, abrasion resistant plastic sheet, as shown. The thickness of the yieldable lamina plus that of its facing-off sheet is such as to enable the lower flange of the outwardly facing channel 66 to fit into the inwardly facing guide channels 20, with the lower flange of 66 in sliding contact with the upper flange of channel 20, for a purpose later explained.

In each of the upper flanges of the pallet-bounding channels 66 there is a large aperture 102 through which the enlarged portion, shown, of a dual-purpose pin 72 passes, with the head of the pin preferably seated therein flush with the upper surface of the flange, the head being easily seized, however, for vertical movements of the pin by virtue of safety strap 104 secured to the floor at one end and attached at the other end by a tab to the head of the pin in conventional manner. The attenuated shank of pins 72 passes through apertures, shown, in the upper flanges of channels 20 and the lower flanges of channels 66. When thus positioned, pins 72 lock the pallet in its predetermined proper stowage position of a floor section and concurrently shut off the air supply from duct 24 to the plenum chamber of the adjacent section, and hence to the ball-valves. At this time, with the pallet stowed and locked in position against acceleration, impact and other pallet-displacement causing forces, there is of course no need of an air layer underneath the pallet, and after they all assume this position, the compressor unit is, of course, de-activated.

Figure 5:
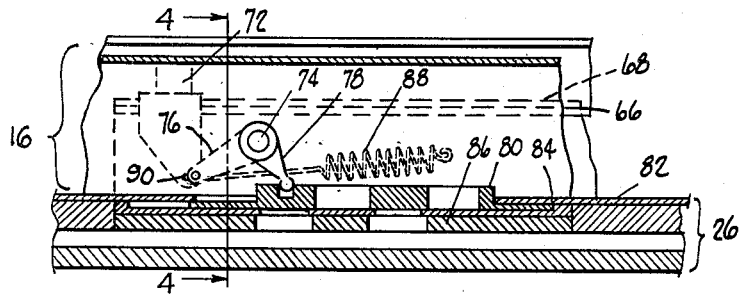
FIG. 5 is a longitudinal section on line 5—5 of FIG. 4 illustrating the pallet locking and zone-valve operating means.

The mechanism whereby a locking pin 72, when inserted in the position shown in FIG. 4, shuts off or de-activates the adjacent zone-control valve is shown in FIGS. 4 and 5 comprising, first, the pin itself and a depressor 70 that cooperates with other parts, later explained, for moving the ported slide valve 80 from its operative position to the closing position shown in FIG. 5. As can be seen in FIG. 4, depressor 70 is L-shaped and its upper horizontal flange 71 is provided with an opening 73 to receive the attenuated portion of pin 72. Opening 73 may be provided with a bayonet slot and pin 72 may have a cooperating bayonet cross-pin to disengageably lock members 70 and 72 together on partial rotation of pin 72 in order to provide for the actuation of parts hereinafter described. On the outboard end of a shaft 74 there is fixed an actuating arm 78, the lower, knobbed end of which engages always in a groove, shown, in the inboard end portion of the slide valve 80. The depressor 70 and the pin 72, when displaced downwardly, cause the shaft 74 to rotate in the counterclockwise direction as viewed in FIG. 5, thus moving the arm 78 to the right as viewed in FIG. 5, thereby to deregister the ports shown in slide valve 80 with those shown sub-adjacent thereto in the upper lamina of the panel or floor section, thus excluding air from the plenum chamber.

This action is caused to occur in a quick-motion, or "snap" fashion by means of a helical spring 88 arranged in "over-center" acting relationship to an arm 76 attached to the inner end of shaft 74 and at an acute angle to the arm 78. The inner end of the spring 88 is attached to the horizontally extending portion of arm 76, as shown in FIG. 5, the outer end of this spring being attached to fixed structure at a point lying above its inner end. Arm 76 is attached by means of pin 90 to the lower end of depressor 70 through a slot or other lost motion connection.

Thus, when the pin and the depressor are raised, the over-center relationship aforementioned causes the arm 70 to rotate clockwise and the arm 78 is snapped leftwardly, urging the air-ports in slide valve 80 into registry with the ports shown in the upper lamina of the panel; contrarywise, when the pin and depressor are forced downwardly, the over-center relationship mentioned above snaps the arm and slide valve out of registry with the ports 86 in the lamina. In both positions, the snap mechanism also serves to positively hold the valve open or closed until the pin is manipulated.

There is also shown an upper keeper or guide 82 for slide valve 80, as well as a lower keeper 84 therefor.

As each pallet or cargo item reaches and rests in its predetermined stowage station on a panel or section of the floor, a pin 72 is inserted as above and, as described closes the adjacent zone-control valve. When the time comes to unload the cargo, the pin 72 in the unit nearest the cargo-exit is removed, activating the pressure-air zone-control valve adjacent thereto and thus providing a layer of lubricating and buoying air underneath the concerned pallet or cargo item to facilitate its unloading. This pin removal action is performed in succession for each of the units including the one most remote from the cargo exit, all the pins of course being left in their removed condition so that the remotest cargo unit can glide the full length of the floor on a layer of pressure-air, whereby the manual, or other, effort necessary to unload and load the cargo hold is minimized.

In FIG. 6 there is shown, at the entrance and exit end of the floor, a transition panel 92 which is constructed like all the other sections except that it is here shown narrower, longitudinally of the floor, than are the other panels. It also includes a wear plate 106 as shown in FIG. 3. It can be as wide as the other panels, if desired. Since it may be inclined downwardly about 1½° from the next adjacent panel 26, with its lower edge resting on the "loading level," 110 such as a low loading dock or the ground, it is not provided with guides 20, but is, as are the other panels, connected flexibly to the pressure air duct 24 and zone-control valve at its one side and is provided with a plenum chamber and with ball valves in its upper lamina, so that it, too, minimizes the effort necessary to urge a pallet or cargo item up the incline into the cargo hold. It is not essential that all abutting edges have wear plates, but it is preferable to have the abutting panels abut mutually as nearly air-tightly as possible; to this end, a conventional elastomeric sealing strip, not shown, may be provided on each of the abutting edges, if desired.

Although the now-preferred embodiment of the invention has been specifically illustrated and described, by way of example, only, it will be understood by those skilled in the art that various modifications and ramifications of the particular embodiment shown may be accomplished without departing from the essence and scope of the invention itself.

I claim:

1. An anti-friction flooring reducing the sliding-friction of objects, such as loaded pallets, moved thereon, comprising: a framework constituting supporting means; a source of pressurized air; a plurality of substantially hollow, slidable-loads, or pallets; load-supporting panels, said panels being disposed on said framework in mutual coplanarity and in mutually edgewise-abutting relationship; each of said panels being disengageably engaged to said framework; for reduction in the number of panels and for rearrangement thereof; means communicating the hollow interior of each panel with said air source; the upper, or load-contacting, face of each panel including a plurality of pressure-air outlets therein; movable air-exit means in each outlet normally closing each outlet, said movable means being load-movable to release pressurized air between the lower surface of a load or pallet and the upper surface of each panel, so as to reduce the sliding friction and lubricate the sliding load; the means that communicate the interiors of the panels with said air source including a conduit extending longitudinally adjacent the panels; a slide-valve means disposed in said conduit laterally adjacent each panel, said slide-valve means being arranged and constructed to be operated so as to supply, and to terminate supply, of air into each adjacent panel; pinning means; and means constructed and arranged with such a spatial and geometrical relation respecting said slide valve, said panel and the slidable-loads or pallets as to enable said pin member to be inserted vertically through a portion of said pallet and a portion of said slide valve so as to thereby concurrently close said slide valve and lock the concerned pallet in position; removal of the aforesaid inserted pinning means concurrently opening the slide valve and unlocking the pallet.

2. A flooring-component according to claim 1, in which the panel assembly that extends from side-to-side and end-to-end of the floor framing lies elevated above the approach loading plane for the vehicle, and in which there is a transition panel lying outside the vehicle body with its front edge supported by and detachably attached to the rear end portion of said floor-framing and having its rear edge resting on the loading-plane and even with, and substantially parallel to said plane, said transition panel being otherwise substantially the same as the other panels, whereby to enable pallets and load-articles to be substantially frictionlessly slid into the vehicle from the loading plane onto the assembly of other panels.

3. In a vehicle, an anti-friction flooring for reducing the sliding-friction thereon of objects slid thereupon, such as loaded pallets, comprising: a basal-framework; a plurality of panels supported in coplanarity and in mutual abutment thereon; each panel being substantially hollow and adapted for receiving pressurized air; a source of pressurized air; a duct connected to said source and extending alongside, and adjacent to, the abutting panels aforesaid, said duct extending from the one end of the flooring substantially to the opposite end thereof; a slide valve unit in said duct located laterally opposite each of said pallets; the aforesaid unit including first valve ports lying on a first upper, face of the valve unit and opening into the duct, said hollow panel having a set of second valve ports in the upper-face region of said panel, said second ports being arranged for registration with the aforesaid first ports, on occasion, so as to establish pressure-air flow from the respective valves in the duct through the respective registered ports into the respective hollow interiors of said panels; the two sets of ports in the slide-valve unit adjacent each pallet being de-registerable to exclude pressure-air from the adjacent panel; and means for sliding the slide member of the slide valve into and out of registration as aforesaid, said means including a pinning-member insertable through an edge-located portion of the pallet-and-valve group and through an upwardly extending adjunct of the panel, said insertion closing the slide valve and locking the pallet in place; removal of said pinning member from the aforesaid position positively opening said slide valve and unlocking the pallet from the panel group.

4. In a vehicle having a hollow body, a flooring-component comprising a source of pressure air; a plurality of substantially hollow load-receiving panels, each occupying a load station, the hollows in said panels defining plenum chambers for the pressure air; a manifold extending longitudinally of the flooring-component superadjacent the panels; a pair of parallel, laterally spaced load-article guides extending longitudinally on the upper faces of the assembled panels; a slide valve disposed laterally opposite each load station; the slide valve including first ports opening on a first face into the manifold; second ports in the upper face of the panel that are registrable with the opposite faces of the first ports to establish flow from the manifold into the plenum chamber, said slide valve being de-registrable with the first ports to exclude manifold air from said chamber; and means for operating said slide valve to place said first ports into and out of registry with said second ports; said means comprising a bell-crank mounted on a shaft extending transversely in the manifold, said crank having one arm engaged in said slide valve and movable forwardly and backwardly therewith in the manifold to respectively de-register and register said first and second ports; said crank having a second arm mounted to said shaft at an obtuse rearward angle to the first arm, said arm having an upbent portion terminating its lower end; a downwardly and upwardly moving member interposed laterally between said arm and the outer surface of one of the load-article guides, said actuator being movable up and down in the vertical plane and constituting a depressor thereby moved out of and into depressing contact with said second arm; and a vertically movable activator integral with said depressor.

5. In a vehicle having a hollow body, a flooring-component comprising a source of pressure air; a plurality of substantially hollow load-receiving panels, each occupying a load station, the hollows in said panels defining plenum chambers for the pressure air; a manifold extending longitudinally of the flooring-component superadjacent the panels; a pair of parallel, laterally spaced load article guides extending longitudinally along the upper faces of the assembled panels; complementary guide means bounding each lateral edge of each panel and adapted to interfit into the first-mentioned guide means; a slide valve disposed laterally opposite each load station; the slide valve including first ports opening on a first face into the manifold; second ports in the upper face of the panel that are registrable with the opposite faces of the first ports to establish flow from the manifold into the plenum chamber, said slide valve being de-registrable with the first ports to exclude manifold air from said chamber; and means for operating said slide valve to place said first ports into and out of registry with said second ports; said means comprising a bell-crank mounted on a shaft extending transversely in the manifold, said crank having one arm engaged in said slide valve and movable forwardly and backwardly therewith in the manifold to respectively de-register and register said first and second ports; said crank having a second arm mounted to said shaft at an obtuse rearward angle to the first arm, said arm having an upbent portion terminating its lower end; a downwardly and upwardly moving member interposed laterally between said arm and the outer surface of one of the load-article guides, said actuator being movable up and down in the vertical plane and constituting a depressor thereby moved into and out of depressing contact with said second arm; and a vertically movable activator integral with said depressor, said activator normally passing through both the first and the second guiding means to both lock the load article in its stowage station and to close said slide valve thereby to exclude air from said plenum chamber when the load article is in stowed position.

6. A construction according to claim 4, in which there is a spring attached at one end to the end of the second arm in an over-center position, the opposite end of said spring being attached to fixed structure thereby to operate said shaft and first arm with an over-center snap action so as to positively hold the valve in closed and open positions.

References Cited in the file of this patent

UNITED STATES PATENTS

| | | |
|---|---|---|
| 629,140 | Vollkommer | July 18, 1899 |
| 2,392,789 | Watter | Jan. 8, 1946 |
| 2,472,623 | Schulze | June 7, 1949 |
| 2,858,774 | Batten | Nov. 4, 1958 |
| 2,918,183 | Petersen | Dec. 22, 1959 |

FOREIGN PATENTS

| | | |
|---|---|---|
| 164,626 | Australia | Aug. 17, 1955 |